United States Patent
Mollov et al.

(10) Patent No.: US 10,732,617 B2
(45) Date of Patent: Aug. 4, 2020

(54) METHOD, DEVICE AND SYSTEM FOR ESTIMATING LEVEL OF DAMAGE OF ELECTRIC DEVICE USING HISTOGRAMS

(71) Applicant: MITSUBISHI ELECTRIC CORPORATION, Tokyo (JP)

(72) Inventors: Stefan Mollov, Rennes (FR); Nicolas Degrenne, Rennes (FR); Nicolas Gresset, Rennes (FR); Jeffrey Ewanchuk, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 266 days.

(21) Appl. No.: 15/580,516

(22) PCT Filed: Jun. 14, 2016

(86) PCT No.: PCT/JP2016/068195
§ 371 (c)(1),
(2) Date: Dec. 7, 2017

(87) PCT Pub. No.: WO2016/208520
PCT Pub. Date: Dec. 29, 2016

(65) Prior Publication Data
US 2018/0329403 A1    Nov. 15, 2018

(30) Foreign Application Priority Data

Jun. 25, 2015 (EP) .................................... 15173787

(51) Int. Cl.
*G05B 23/00* (2006.01)
*G05B 23/02* (2006.01)
*G05B 19/4065* (2006.01)

(52) U.S. Cl.
CPC ..... *G05B 23/0227* (2013.01); *G05B 19/4065* (2013.01); *G05B 23/0224* (2013.01);
(Continued)

(58) Field of Classification Search
CPC ............ G05B 23/0227; G05B 23/0224; G05B 23/0283; G05B 19/4065;
(Continued)

(56) References Cited

U.S. PATENT DOCUMENTS

| 6,294,988 B1 * | 9/2001 | Shomura ............... F02B 61/045 340/438 |
| 2003/0137194 A1 | 7/2003 | White et al. |

(Continued)

FOREIGN PATENT DOCUMENTS

| JP | 2006-053016 A | 2/2006 |
| JP | 2014-148294 A | 8/2014 |

OTHER PUBLICATIONS

Notification of Reasons for Refusal issued in corresponding Japanese Application No. 2017-543850, with English translation.

(Continued)

*Primary Examiner* — Gregory J Toatley, Jr.
*Assistant Examiner* — Lynda Dinh
(74) *Attorney, Agent, or Firm* — Birch, Stewart, Kolasch & Birch, LLP (57) ABSTRACT

The present invention concerns a method for estimating a level of damage of an electric device. The method comprises the steps of: forming a histogram of operating cycles related to the electric device for which the level of damage estimation is performed, comparing the formed histogram to histograms of a collection of histograms or to combinations of histograms of the collection of histograms, each histogram of the collection of histogram being associated to a level of damage, in order to determine the histogram of the collection of histograms or the combination of histograms which is the closest from the formed histogram, determining an estimate of the level of damage of the electric device from the level of damage of the closest histogram or from the (Continued)

levels of damages of the histograms of the closest combination of histograms.

12 Claims, 6 Drawing Sheets

(52) U.S. Cl.
CPC ............... *G05B 23/0283* (2013.01); *G05B 2219/32234* (2013.01); *G05B 2219/32235* (2013.01); *G05B 2219/37252* (2013.01)

(58) Field of Classification Search
CPC .......... G05B 2219/32234; G05B 2219/32235; G05B 2219/37252
See application file for complete search history.

(56) References Cited

U.S. PATENT DOCUMENTS

| | | | |
|---|---|---|---|
| 2012/0041575 A1 | 2/2012 | Maeda et al. | |
| 2013/0132000 A1* | 5/2013 | Tamaki | G05B 23/0224 702/35 |
| 2013/0274898 A1* | 10/2013 | Thatikonda | G05B 23/0224 700/44 |
| 2015/0081599 A1* | 3/2015 | Dobler | G06N 20/00 706/12 |

OTHER PUBLICATIONS

First Office Action issued in corresponding Chinese Application No. 201680036925.9 dated Sep. 24, 2019.

* cited by examiner

METHOD, DEVICE AND SYSTEM FOR ESTIMATING LEVEL OF DAMAGE OF ELECTRIC DEVICE USING HISTOGRAMS

CROSS-REFERENCE TO RELATED APPLICATIONS

This application is the National Phase of PCT International Application No. PCT/JP2016/068195, filed on Jun. 14, 2016, which claims priority under 35 U.S.C. § 119(a) to patent application Ser. No. 15/173,787.1, filed in Europe on Jun. 25, 2015, all of which are hereby expressly incorporated by reference into the present application.

TECHNICAL FIELD

The present invention relates generally to a method and device for estimating a level of damage of an electric device.

BACKGROUND ART

In the field of Power Electronics, some devices are known as vulnerable components. Electrolytic capacitors, power modules, batteries and electric motors are some of them.

For example, at end of life, electrolytic capacitors can even fail in short circuit potentially leading to serious problems.

Trying to estimate the level of damage of such electric devices is then an important issue.

One possible way to estimate the level of damage of electric devices is the condition monitoring based on measurements made at the heart of the electric device at a given time, without taking into account the history of stresses of the electric device. This approach is reliable but requires getting access to the electric device itself for making measurements, which is not easy for commercial products.

SUMMARY OF INVENTION

Technical Problem

Such an approach is not satisfactory for constructors and/or customers.

For example, when the electric device is used in electrical cars, it is important to identify on which vehicles the electric device has reached a significant damage level. The constructor can warn the customer and propose a control/exchange of the near-to-be-damaged electric device. This service provides an increased quality control for the fleet of vehicles.

The same arises for a fleet of offshore windmills where the maintenance costs are prohibitive and access is limited.

Solution to Problem

The present invention aims at estimating the level of damage of an electric device based on data that are easily available and do not increase the cost of the product that is an important feature for the constructor and/or customer.

To that end, the present invention concerns a method for estimating a level of damage of an electric device characterized in that the method comprises the steps of:
  forming a histogram of operating cycles related to the electric device for which the level of damage estimation is performed,
  comparing the formed histogram to histograms of a collection of histograms or to combinations of histograms of the collection of histograms, each histogram of the collection of histograms being associated to a level of damage, in order to determine the histogram of the collection of histograms or the combination of histograms which is the closest from the formed histogram,
  determining an estimate of the level of damage of the electric device from the level of damage of the closest histogram or from the levels of damages of the histograms of the closest combination of histograms.

The present invention concerns also a device for estimating a level of damage of an electric device characterized in that the device for estimating comprises:
  means for forming a histogram of operating cycles related to the electric device for which the level of damage estimation is performed,
  means for comparing the formed histogram to histograms of a collection of histograms or to combinations of histograms of the collection of histograms, each histogram of the collection of histograms being associated to a level of damage, in order to determine the histogram of the collection of histograms or the combination of histograms which is the closest from the formed histogram,
  means for determining an estimate of the level of damage of the electric device from the level of damage of the closest histogram or from the levels of damages of the histograms of the closest combination of histograms.

The present invention concerns also a system for estimating a level of damage of an electric device characterized in that the system comprises:
  means for forming a histogram of operating cycles related to the electric device for which the level of damage estimation is performed,
  means for comparing the formed histogram to histograms of a collection of histograms or to combinations of histograms of the collection of histograms, each histogram of the collection of histogram being associated to a level of damage in order to determine the histogram of the collection of histograms or the combination of histograms which is the closest from the formed histogram,
  means for determining an estimate of the level of damage of the electric device from the level of damage of the closest histogram or from the levels of damages of the histograms of the closest combination of histograms.

Thus, it is possible to estimate the level of damage of an electric device based on data that are easily available and which does not reasonably increase the cost of an electric device and which provides a satisfaction for the constructor and/or customer of the electric device.

According to a particular feature, the collection of histograms is generated from a database of histograms obtained from measurements of cycles and of level of damages of other electric devices having the same functionality as the electric device.

Thus, it is possible to generate the collection of histograms from data gathered during or after the real-life operation of similar devices.

According to a particular feature, the formed histogram and histograms of the collection of histograms are defined by bins representing, values, temperature range, speed range, acceleration range and of a number elementary cycles in said bin.

Thus, the histogram bins can represent a combination of several parameters indicative of the stress of the electric device.

According to a particular feature, the formed histogram and histograms of the collection of histograms are normalized by dividing, for each bin, the number elementary cycles by the sum of the number of elementary cycles in the bins.

Thus, the comparison between histograms is eased.

According to a particular feature, the comparing step of the formed histogram to histograms of a collection of histograms or to combinations of histograms of the collection of histograms is performed by a comparison with quadratic distance.

Thus, the similarity between the formed histogram and the histograms of a collection of histograms or the combination of histograms of the collection of histograms is evaluated in a weighted manner.

According to a particular feature, the method comprises further step of notifying the determined estimate of the level of damage.

Thus, it is possible to warn the user of the device about the state of health and issue an early warning for maintenance.

According to a particular feature, the method comprises further step of converting the level of damage into a lifetime expectation, and notifying the remaining lifetime expectation to the user.

Thus, it is possible to warn the user of the device about the estimated time of failure.

According to a particular feature, that combinations of histograms are linear combinations of histograms.

Thus, the computation of the combination of histograms is eased.

According to a particular feature, the method is executed by a damage assessment device and in that the collection of histograms is stored in the memory of the damage assessment device or is obtained from a server through a telecommunication network.

Thus, the damage assessment device can compute the damage level autonomously, when required.

According to a particular feature, the step of forming the histogram of operating cycles is performed by a damage assessment device and the method comprises further step of transferring the formed histogram to a server which performs the comparing step, the determining steps and a further step of transferring the estimate of the level of damage of the electric device being performed by the server.

Thus, it is possible to decrease the computation effort in the device and optimise the transmission of data between the device and the server.

According to a particular feature, the method comprises further steps executed by the server of:
- receiving histograms obtained from measurements of cycles and of level of damages of other electric devices having the same functionality as the electric device,
- updating the database of histograms using the received histograms.

Thus, the collection of histograms used to calculate the damage level of the formed histogram can be updated during the life of the electric device.

The characteristics of the invention will emerge more clearly from a reading of the following description of example embodiments, the said description being produced with reference to the accompanying drawings, among which:

DESCRIPTION OF EMBODIMENTS

Figure 1:
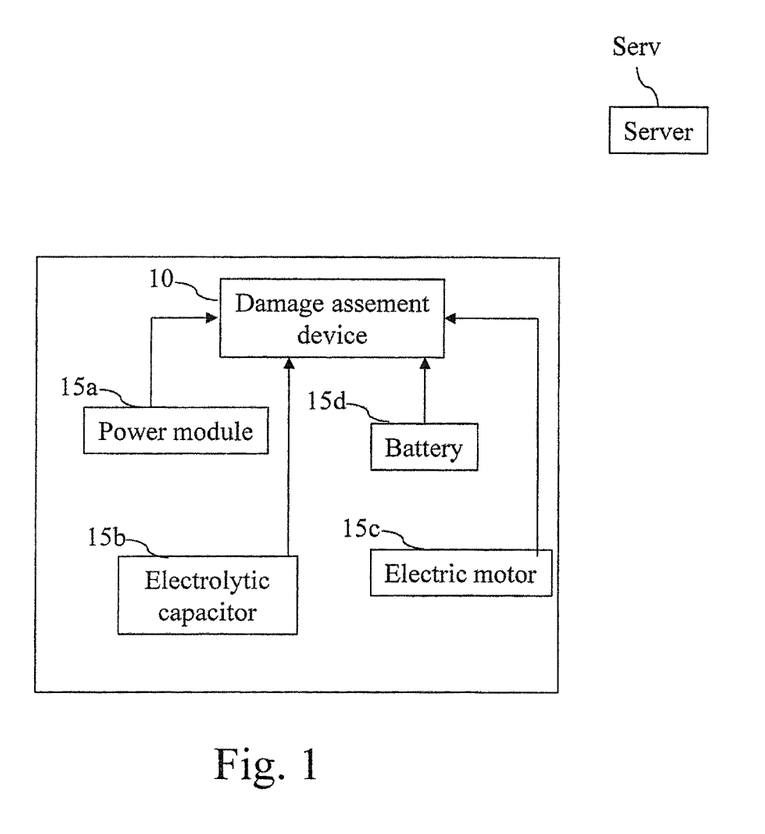
FIG. 1 represents an example of an architecture of a system for determining the damage assessment of an electric device according to the present invention.

FIG. 1 represents an example of an architecture of a system for determining the damage assessment of an electric device according to the present invention.

The system for determining the damage assessment of an electric device is for example implemented in an electric car.

A damage assessment device 10 is used for determining the level of damage of at least one electric device.

In the example of FIG. 1, the damage assessment device 10 is used for determining the level of damage of a power module 15a, an electrolytic capacitor 15b, an electric motor 15c and a battery 15d.

The system for determining the level of damage of an electric device may according to the second, third and fourth modes of realization comprise a server Serv.

The server Serv may execute partially the present invention as it will be disclosed hereinafter.

Figure 2:
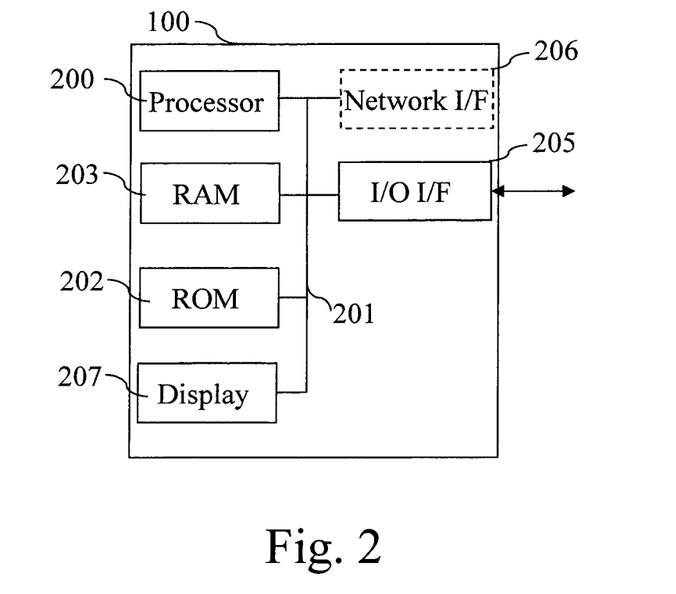
FIG. 2 represents an example of the architecture of a damage assessment device according to the present invention.

FIG. 2 represents an example of the architecture of a damage assessment device according to the present invention.

The damage assessment device 10 has, for example, an architecture based on components connected together by a bus 201 and a processor 200 controlled by a program as disclosed in FIG. 4 or 5A or 6A or 7A.

The bus 201 links the processor 200 to a read only memory ROM 202, a random access memory RAM 203, an input output I/O IF interface 205, a display 207 and a network interface 206 according to the second third and fourth modes of realization of the present invention.

The memory 203 contains registers intended to receive variables and the instructions of the program related to the algorithm as disclosed in FIG. 4 or 5A or 6A or 7A.

The processor 200 receives through the input output I/O IF 205, for example sensed temperature, acceleration and/or speed measurements.

The processor 200, may command the display 207 in order to notify the level of damage of at least one electric device or may command the display 207 in order to notify a lifetime expectation of the electric device.

The network interface 206 may be a wired connection which is used during the maintenance of the vehicle to transfer and/or receive data or may be a wireless interface.

The read-only memory, or possibly a Flash memory 202 contains instructions of the program related to the algorithm as disclosed in FIG. 4 or 5A or 6A or 7A, when the damage assessment device 10 is powered on, to the random access memory 203.

The damage assessment device 10 may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

In other words, the damage assessment device 10 includes circuitry, or a device including circuitry, causing the damage assessment device 10 to perform the program related to the algorithm as disclosed in FIG. 4 or 5A or 6A or 7A.

Figure 3:
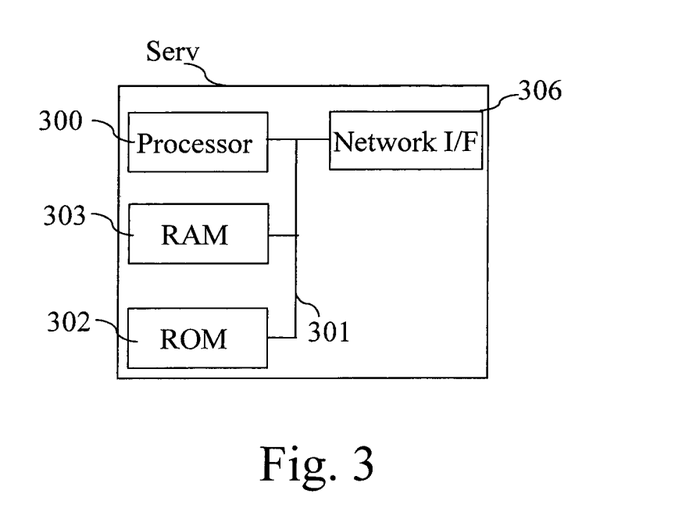
FIG. 3 represents an example of a server on which the present invention may be implemented.

FIG. 3 represents an example of a server on which the present invention may be implemented.

Figure 5A:
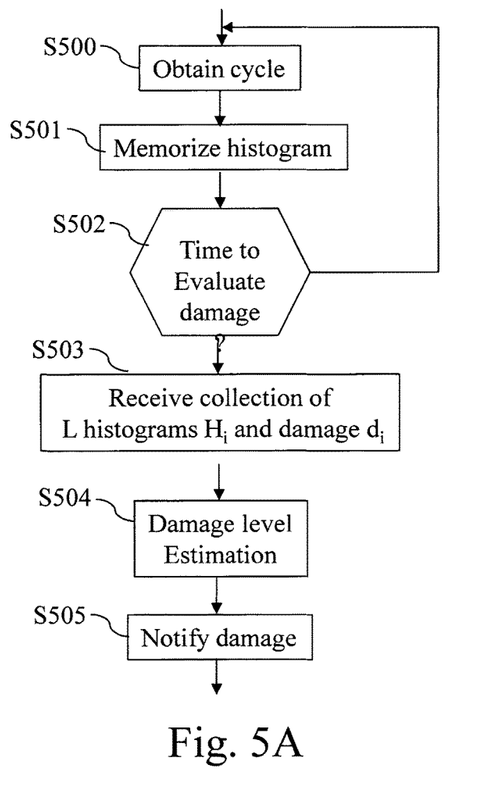
FIG. 5A represents a second example of an algorithm for determining the damage assessment level of an electric device according to the present invention.
Figure 5B:
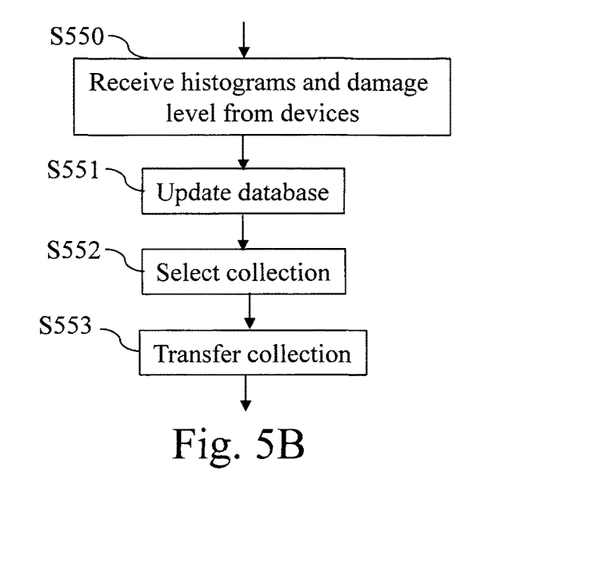
FIG. 5B represents a second example of an algorithm for determining the damage assessment level of an electric device according to the present invention.
Figure 6A:
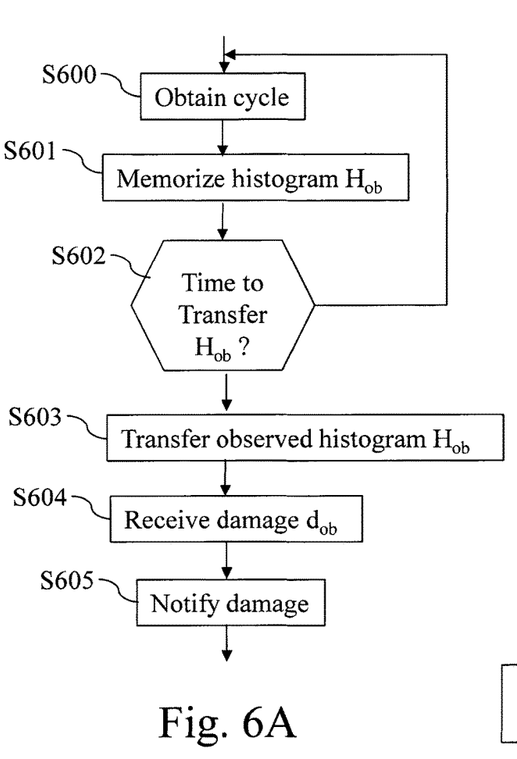
FIG. 6A represent a third example of an algorithm for determining the damage assessment level of an electric device according to the present invention.
Figure 6B:
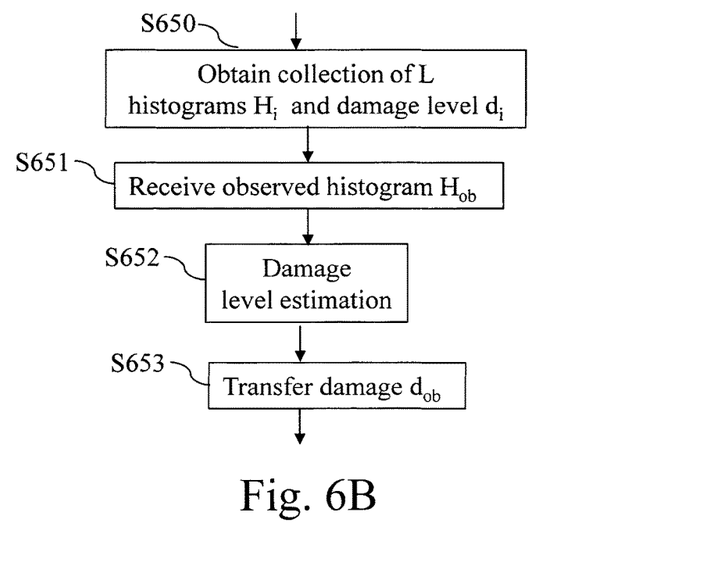
FIG. 6B represent a third example of an algorithm for determining the damage assessment level of an electric device according to the present invention.
Figure 7A:
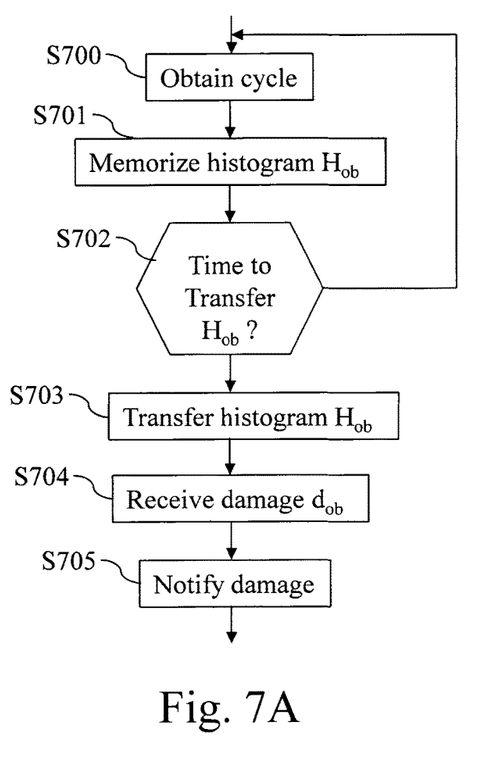
FIG. 7A represents a fourth example of an algorithm for determining the damage assessment level of an electric device according to the present invention.
Figure 7B:
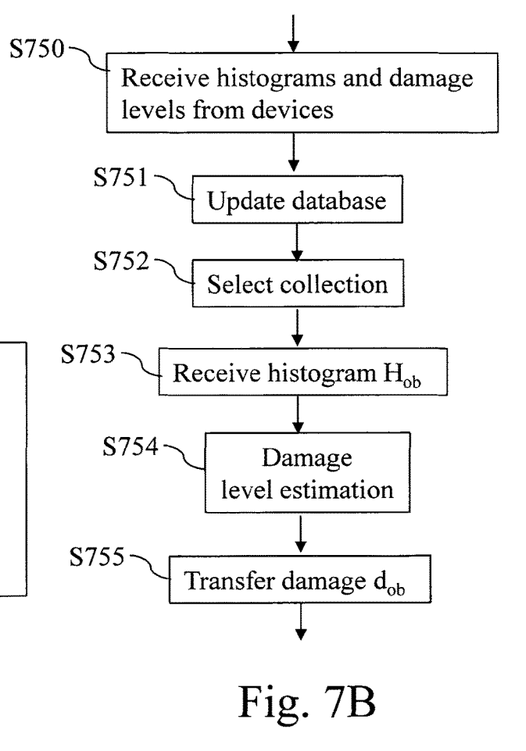
FIG. 7B represents a fourth example of an algorithm for determining the damage assessment level of an electric device according to the present invention.

The server Serv has, for example, an architecture based on components connected together by a bus 301 and a processor 300 controlled by a program as disclosed in FIG. 5B or 6B or 7B.

The bus 301 links the processor 300 to a read only memory ROM 302, a random access memory RAM 303 and a network interface 306.

The memory 303 contains registers intended to receive variables and the instructions of the program related to the algorithm as disclosed in FIG. 5B or 6B or 7B.

The network interface 306 may be a wired connection which is used during the maintenance of the vehicle to transfer and/or receive data or may be a wireless interface.

The read only memory, or possibly a Flash memory 302 contains instructions of the program related to the algorithm as disclosed in FIG. 5B or 6B or 7B, when the server Serv is powered on, to the random access memory 303.

The server Serv may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

In other words, the server Serv includes circuitry, or a device including circuitry, causing the server serv to perform the program related to the algorithm as disclosed in FIG. 5B or 6B or 7B.

Figure 4:
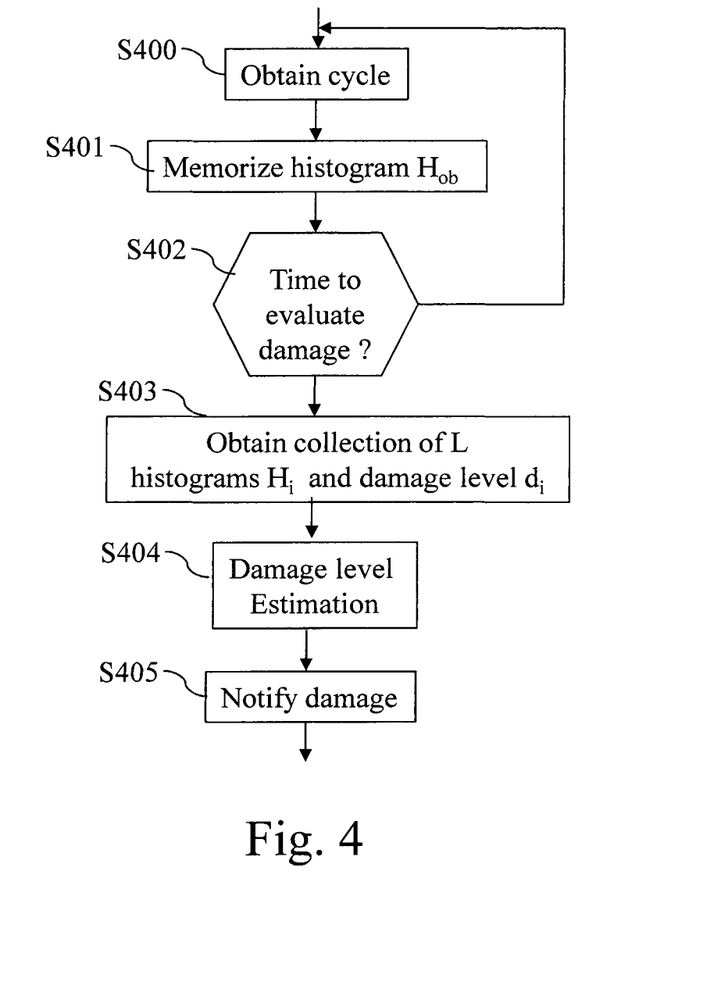
FIG. 4 represents a first example of an algorithm for determining the damage assessment level of an electric device according to the present invention.

FIG. 4 represents a first example of an algorithm for determining the damage assessment level of an electric device according to the present invention.

More precisely, the present algorithm is executed by the processor 200 of the damage assessment device 10.

At step S400, the processor 200 obtains cycles related to the electric device for which the level of damage estimation is performed.

A cycle is, for example, a change of the electric device operating temperature within a given temperature range during the functioning of the electric device.

A cycle may be an operation of the electric device within a given range of speed and/or acceleration during the functioning of the electric device.

At next step S401, the processor 200 stores the obtained cycle in memory in the form of a histogram and/or updates a histogram formed already from previous obtained cycles.

The processor 200 builds a histogram representing the history of stress of the electric device.

Several types of histograms may be built, histograms are defined by bins representing, for example, values, temperature range, speed range, acceleration range and the number of elementary cycles in said bin.

For example, the histogram bins represent a couple like an average of the temperature and a temperature variation. The temperature can either be measured by a sensor or be computed from a thermal model that converts the voltage and intensity input signal into a temperature fluctuation in the electric device.

For example, when the electric device is a power module for an electric car, each histogram bin corresponds to a couple speed/acceleration, and the value stored by each bin is the number of elementary distance for this mode.

For example, when the electric device is an offshore windmill, each histogram bin corresponds to the output power and the value stored by each bin is the number of elementary time period, for example, 1 second spent in this mode.

The histogram may be normalized to one, i.e. each bin value is divided by the sum of all bins. In this case, the scaling factor is memorized as part of collection of histogram information.

At next step S402, the processor 200 checks if it is time to evaluate the damage of the electric device. For example, during maintenance operation, the damage of the electric device is evaluated or the damage of the electric device is evaluated periodically, for example every day, or week or the damage of the electric device is evaluated each time the system comprising the electric device is powered on.

If it is time to evaluate the damage of the electric device, the processor 200 moves to step S403. Otherwise the processor 200 returns to step S400.

At next step S403, the processor 200 obtains a collection of histograms from memory, and the corresponding damage. In the case of a collection of normalized histograms, the scaling factor is also obtained.

The collection of histograms is generated from a database of histograms. The database of histograms may be obtained from several measurements of cycles and of the damage on several other similar electric devices. The collection of histograms is stored in the damage assessment device at manufacturing and/or updated during the maintenance of the electric device.

For example, when the damage is related to the number of power cycles, when a device breaks, the histogram of stresses, according to the power cycles, temperature, temperature variation definition, is stored in the database as a new observed profile. The histogram might be first normalized to one, each bin value is divided by the sum of all bins, which involves that the value 1 now represents the break threshold for the profile.

When a maintenance operation is performed, a measure of the damage may be made, for example by measuring a particular output of a test, and stored along with the histogram in the database as a new observed profile or by replacing an existing profile.

When the number N of profiles in the database becomes too large, a pruning of the observed profiles may be necessary in order to limit the complexity of the minimizing of the utility function.

In other words, the processor 200 extracts a collection of L reference profiles from N database profiles, where N can grow with time according to feedback from the device fleet updated during maintenance and where the L reference profiles are not necessarily a selection of L out of N profiles. This defines the training phase of the a vector quantization, where the training set is the set of N histograms of observed profiles, the L centroids are the histograms of reference profiles, and the distance may be a utility function used in the damage evaluation.

For example, in order to build the collection of histograms, it is picked an observed profile from the database at random out of the N.

For example, a histogram of reference profile is found as the closest to the picked observation profile according to the utility function.

For example, the histogram of reference profile is moved to the collection of histograms by applying a weighted average of the histograms of two profiles.

The previous steps for building the collection of histograms are repeated a given number of times.

The extraction of the collection may also be performed in order to facilitate the following step of damage level estimation.

For example, the collection can be selected to build a basis of linearly independent histograms where another observed vector can be easily expressed as a linear combination of the histograms in the basis.

The processor 200 computes, for each histogram of the collection of histograms, the damage value by considering the collection of histograms to the closest to histogram formed at step S401.

At next step S404, the processor 200 determines a damage level estimation of the electric device.

The processor 200 compares the histogram stored at step S401 to histograms stored into the memory 203.

From a general point of view, the processor 200 performs a comparison with quadratic distance. Thus, one can define a general approach for estimating the damage as a minimization of a utility function $D(p_i, p_{ob}, \{a_i\} \in \Omega)$ where $\Omega$ is the target set of set of parameters $\{a_i\}$ to which the minimization is restricted. For example is either the whole set of real valued vectors of size L or the set of L vectors of size L with all null entries but one equal to one, or the set of vectors of size L with all null entries but M for a combination of the most relevant M profiles. The utility function $D(p_i, p_{ob}, \{a_i\} \in \Omega)$ is for example a quadratic distance, a max-distance or a modified Kullback-Liebler divergence as disclosed in the paper of S. Kullback, *Information theory and statistics*, John Wiley and Sons, N Y, 1959.

The algorithm for minimizing the utility function may be an exhaustive search, when possible, among the set $\Omega$ of solutions or a random search among the set $\Omega$ of solutions or an algorithm, such as the Moore-Penrose Pseudo inverse, when the utility function is the quadratic distance and when $\Omega$ is the whole set of real valued vectors of size L.

The Moore-Penrose Pseudo inverse algorithm is disclosed in the paper of Moore, E. H. (1920). "On the reciprocal of the general algebraic matrix". *Bulletin of the American Mathematical Society* 26 (9): 394-395. doi:10.1090/S0002-9904-1920-03322-7.

According to a first particular mode of realization, the processor 200 compares the obtained history of stresses in the form of a histogram, to a collection of reference profiles in the form of histograms. The history of stresses is a histogram $H_{ob}=(H_{ob}(1), \ldots, H_{ob}(K))$, where K is the number of bins of the histogram which can be multi dimensional, each bin being associated to a t-uple of values, for example a couple (temperature, temperature variation). Each histogram H, of the profile collection is of the same form as $H_{ob}$.

The processor 200 may, if it not already performed, normalize the histogram representing the history of stresses, in which the sum $$S_{ob} = \sum_k H_{ob}(k)$$

is computed and allows to define the normalized histogram $p_{ob}$ such that $p_{ob}(k)=H_{ob}(k)/S_{ob}$.

The processor 200 may perform the same normalization if needed, for all of L histograms $H_i$ of the collection of normalized histograms $p_i$. In this case, the scaling factor is memorized as part of collection of histogram information.

The processor 200 computes the distances $D(p_{ob}, p_i)$ which allows to characterize the resemblance between $H_i$ belonging to the collection of histograms and $H_{ob}$ stored in memory at step S401, and which is null if $H_i=H_{ob}$.

For example, the processor 200 uses the following utility function to be minimized $$D(p_i, p_{ob}) = \sum_k \|p_i(k) - p_{ob}(k)\|^2$$

which is a quadratic distance, $$D(p_i, p_{ob}) = \max_k \|p_i(k) - p_{ob}(k)\|$$

which is a max-distance, $$D(p_i, p_{ob}) = \sum_k p_i(k)\log\left(\frac{p_i(k)+\varepsilon}{p_{ob}(k)+\varepsilon}\right)$$

which is a modified Kullback-Liebler divergence and $\varepsilon$ is a parameter that stabilizes the computation.

According to a second particular mode of realization, the profile collections containing histograms are combined in order to approach the obtained histogram of the history of stresses.

Preferably, the combination is linear, i.e., the processor 200 finds the set of parameters $a_1, \ldots, a_L$ such that a distance $D( )$ is minimized. For example, the processor 200 defines the following utility function to be minimized $$D(p_i, p_{ob}, \{a_i\}) = \left\|\sum_{i=1}^{L} a_i p_i - p_{ob}\right\|^2$$

$$= \sum_{k=1}^{K} \left|\sum_{i=1}^{L} a_i p_i(k) - p_{ob}(k)\right|^2$$

This can be obtained by defining a matrix P such that $P(k,i)=p_i(k)$, and a vector A such that $A(i)=a_i$. Thus, the comparison is performed by finding A that minimizes $$\hat{A} = {}_A\min\|PA - p_{ob}\|^2$$

where $\hat{A}$ can be obtained by using the Moore-Penrose pseudo inverse computation.

The processor 200 determines the damage from the result of the comparison.

From a general point of view the processor 200 estimates the damage from the set of parameters $\hat{a}_i$ obtained after the optimization function by $$d_{ob} = S_{ob}\sum_i \hat{a}_i \frac{d_i}{S_i}$$

According to the first particular mode of realization, the processor 200 determines the index $\hat{i}$ as the one minimizing the utility function $D(p_{ob}, p_i)$, which allows to obtain a damage estimation $d_{ob} = d_{\hat{i}}S_{ob}/S_{\hat{i}}$ associated to the obtained history of stresses, where $d_i$ is the damage value associated to the reference profile i.

It has to be noted here that the estimated damage is either directly the total damage of the electric device or accumulated to the previous total damage estimation.

According to the second particular mode of realization, once A is found, which gives the parameters $\hat{a}_i$, the processor 200 computes the damage estimation by using $$d_{ob} = S_{ob}\sum_i \hat{a}_i \frac{d_i}{S_i}$$

At next step S405, the processor 200 commands the display 207 in order to notify the damage information of at least one electric device.

According to a particular mode of realization, the processor 200 command the display 207 in order to notify the level of damage of at least one electric device.

According to another particular mode of realization, the processor 200 commands the display 207 in order to notify an estimation of the remaining lifetime before failure of at least one electric device. The remaining lifetime before failure determined by the processor 200. For example, the processor 200 uses a linear extrapolation of the total damage level evolution through time, and where the remaining lifetime before failure is obtained by computing the crossing point between the extrapolated curve of total damage level and a damage level threshold.

FIGS. 5A and 5B represent a second example of an algorithm for determining the level of damage of an electric device according to the present invention.

More precisely, the algorithm of FIG. 5A is executed by the processor 200 of the damage assessment device 10.

At step S500, the processor 200 obtains cycles related to the electric device for which the level of damage estimation is performed.

A cycle is, for example, a change of the electric device operating temperature within a given temperature range during the functioning of the electric device.

A cycle may be an operation of the electric device within a given range of speed and/or acceleration during the functioning of the electric device.

At next step S501, the processor 200 stores the obtained cycle in memory in the form of a histogram and/or updates a histogram formed already from previous obtained cycles.

The processor 200 builds a histogram representing the history of stress of the electric device.

Several types of histograms may be built, histograms are defined by bins representing values, temperature range, speed range, acceleration range and the number of elementary cycles in said bin.

For example, the histogram bins represent a couple like an average of the temperature and a temperature variation. The temperature can either be measured by a sensor or be computed from a thermal model that converts losses into a temperature fluctuation in the electric device.

For example, when the electric device is a power module for an electric car, each histogram bin corresponds to a couple speed/acceleration, and the value stored by each bin is the number of elementary distance for this mode.

For example, when the electric device is an offshore windmill, each histogram bin corresponds to the output power and the value stored by each bin is the number of elementary time period, for example, 1 second spent in this mode.

The histogram may be normalized to one, i.e. each bin value is divided by the sum of all bins. In this case, the scaling factor is memorized as part of collection of histogram information.

At next step S502, the processor 200 checks if it is time to evaluate the damage of the electric device. For example, during maintenance operation, the damage of the electric device is evaluated or the damage of the electric device is evaluated periodically, for example every day, or week or the damage of the electric device is evaluated each time the system comprising the electric device is powered on.

If it is time to evaluate the damage of the electric device, the processor 200 moves to step S503. Otherwise the processor 200 returns to step S500.

At step S503, the processor 200 receives from a server Serv a collection of histograms or information related to a collection of histograms.

Information related to a collection of histograms are for example, one matrix P related to each histogram of a collection of histograms, such that $P(k,i) = p_i(k)$, and a vector A such that $A(i) = a_i$. The matrix P is obtained after normalisation of the matrix H. In this case, the scaling factor is memorized as part of collection of histogram information.

At next step S504, the processor 200 determines a damage level estimation of the electric device.

The processor 200 compares the histogram memorized at step S501 to histograms of the collection of histograms received at step S503.

From a general point of view, the processor 200 performs a comparison with quadratic distance. Thus, one can define a general approach for estimating the damage as a minimization of a utility function $D(p_i, p_{ob}, \{a_i\}\in\Omega)$ where $\Omega$ is the target set of set of parameters $\{a_i\}$ to which the minimization is restricted. For example $\Omega$ is either the whole set of real valued vectors of size L or the set of L vectors of size L with all null entries but one equal to one, or the set of vectors of size L with all null entries but M for a combination of the most relevant M profiles. The utility function $D(p_i, p_{ob}, \{a_i\}\in\Omega)$ is for example a quadratic distance, a max-distance or a modified Kullback-Liebler divergence.

The algorithm for minimizing the utility function may be an exhaustive search, when possible, among the set $\Omega$ of solutions or a random search among the set $\Omega$ of solutions or an algorithm, such as the Moore-Penrose Pseudo inverse, when the utility function is the quadratic distance and when) is the whole set of real valued vectors of size L.

According to a first particular mode of realization, the processor 200 compares the obtained history of stresses in the form of a histogram, to a collection of reference profiles in the form of histograms. The history of stresses is a histogram $H_{ob}=(H_{ob}(1), \ldots, H_{ob}(K))$, where K is the number of bins of the histogram which can be multi dimensional, each bin being associated to a t-uple of values, for example a couple (temperature, temperature variation)). Each histogram $H_i$ of the profile collection is of the same form as $H_{ob}$.

The processor 200 may, if it not already performed, normalize the histogram representing the history of stresses, in which the sum $$S_{ob} = \sum_k H_{ob}(k)$$

is computed and allows to define the normalized histogram $p_{ob}$ such that $p_{ob}(k)=H_{ob}(k)/S_{ob}$.

The processor 200 may perform the same normalization if needed, for all of L histograms $H_i$ of the collection of normalized histograms $p_i$.

The processor 200 computes the distances $D(p_{ob}, p_i)$ which allows to characterize the resemblance between $H_i$ belonging to the collection of histograms and $H_{ob}$ stored in memory at step S501, and which is null if $H_i=H_{ob}$.

For example, the processor 200 uses the following utility function to be minimized $$D(p_i, p_{ob}) = \sum_k \|p_i(k) - p_{ob}(k)\|^2$$

which is a quadratic distance, $$D(p_i, p_{ob}) = \max_k \|p_i(k) - p_{ob}(k)\|$$

which is a max-distance, $$D(p_i, p_{ob}) = \sum_k p_i(k) \log\left(\frac{p_i(k)+\varepsilon}{p_{ob}(k)+\varepsilon}\right)$$

which is a modified Kullback-Liebler divergence and ε is a parameter that stabilizes the computation.

According to a second particular mode of realization, the profile collection containing histograms are combined in order to approach the obtained histogram of the history of stresses.

Preferably, the combination is linear, i.e., the processor 200 finds the set of parameters $a_1, \ldots, a_L$ such that a distance $D(\ )$ is minimized. For example, the processor 200 defines the following utility function to be minimized $$D(p_i, p_{ob}, \{a_i\}) = \left\|\sum_{i=1}^L a_i p_i - p_{ob}\right\|^2 = \sum_{k=1}^K \left|\sum_{i=1}^L a_i p_i(k) - p_{ob}(k)\right|^2$$

This can be obtained by defining a matrix P such that $P(k,i)=p_i(k)$, and a vector A such that $A(i)=a_i$. Thus, the comparison is performed by finding A that minimizes $$\hat{A} = \min_A \|PA - p_{ob}\|^2$$

where $\hat{A}$ can be obtained by using the Moore-Penrose pseudo inverse computation.

If the processor 200 receives at step S503 information related to the collection of histograms, the processor 200 does not find the set of parameters $a_1, \ldots, a_L$ as they are already provided such that a distance D(p) is minimized.

The processor 200 determines the damage from the result of the comparison or from the information related to the collection of histograms.

From a general point of view the processor 200 estimates the damage from the set of parameters $\hat{a}_i$, obtained after the optimization function by $$d_{ob} = S_{ob} \sum_i \hat{a}_i \frac{d_i}{S_i}$$

According to the first particular mode of realization, the processor 200 determines the index $\hat{i}$ as the one minimizing the utility function $D(p_{ob}, p_i)$, which allows to obtain a damage estimation $d_{ob}=d_{\hat{i}} S_{ob}/S_{\hat{i}}$ associated to the obtained history of stresses, where $d_i$ is the damage value associated to the reference profile i.

It has to be noted here that the estimated damage is either directly the total damage of the electric device or accumulated to the previous total damage estimation.

According to the second particular mode of realization, once A is found, which gives the parameters $\hat{a}_i$, the processor 200 computes the damage estimation by using $$d_{ob} = S_{ob} \sum_i \hat{a}_i \frac{d_i}{S_i}$$

At next step S505, the processor 200 commands the display 207 in order to notify the damage information of at least one electric device.

According to a particular mode of realization, the processor 200 commands the display 207 in order to notify the level of damage of at least one electric device.

According to another particular mode of realization, the processor 200 commands the display 207 in order to notify an estimation of the remaining lifetime before failure of at least one electric device. The remaining lifetime before failure determined by the processor 200. For example, the processor 200 uses a linear extrapolation of the total damage level evolution through time, and where the remaining lifetime before failure is obtained by computing the crossing point between the extrapolated curve of total damage level and a damage level threshold.

More precisely, the algorithm of FIG. 5B is executed by the processor 300 of the server Serv.

At step S550, the processor 300 obtains histograms received from damage level assessment devices. The histograms are received for example during maintenance operation and/or periodically.

For example, when histograms are related to the number of power cycles, when a device breaks, the received histograms of stresses, according to the power cycles, temperature, temperature variation definition, are stored in the database of the server Serv as a new observed profile. The histogram might be first normalized to one each bin value is divided by the sum of all bins, which involves that the value 1 now represents the break threshold for this profile.

When a maintenance operation is performed, a measure of the damage may be made, for example by measuring a particular output of a test, and stored along with the histogram in the database as a new observed profile or by replacing an existing profile.

At next step S551, the processor 300 updates a database of histograms with the received histograms.

When the number of observed profiles becomes too large, the processor 300 performs at step S552 a pruning of the collection of histograms in order to limit the complexity of the minimizing of the utility function.

In other words, the processor 300 extracts L reference profiles from N observed profiles, where N can grow with time according to feedback from the device fleet updated during maintenance, and where the L reference profiles are not necessarily a selection of L out of N profiles. This defines the training phase of the a vector quantization, where the training set is the set of N histograms of observed profiles, the L centroids are the histograms of reference profiles, and the distance may be a utility function used in the damage evaluation.

For example, in order to build the collection of histograms, it is picked an observed profile from the database at random out of the N.

For example, a histogram of reference profile is found as the closest to the picked observation profile according to the utility function.

For example, the histogram of reference profile is move to the collection of histograms by applying a weighted average of the histograms of two profiles.

The previous steps for building the collection of histograms are repeated a given number of times.

The extraction of the collection may also be performed in order to facilitate the damage level estimation. For example, the collection can be selected to build a basis of linearly independent histograms where another observed vector can be easily expressed as a linear combination of the histograms in the basis.

At next step S553 the processor 300 commands the transfer of the updated collection of histograms assessment or the transfer of information related to the collection of histograms to at least one damage assessment device 10.

FIGS. 6A and 6B represent a third example of an algorithm for determining the level of damage of an electric device according to the present invention.

More precisely, the algorithm of FIG. 6A is executed by the processor 200 of the damage assessment device 10.

At step S600, the processor 200 obtains cycles related to the electric device for which the level of damage estimation is performed.

A cycle is, for example, a change of the electric device operating temperature within a given temperature range during the functioning of the electric device.

A cycle may be an operation of the electric device within a given range of speed and/or acceleration during the functioning of the electric device.

At next step S601, the processor 200 stores the obtained cycle in memory in the form of a histogram and/or updates a histogram formed already from previous obtained cycles.

The processor 200 builds a histogram representing the history of stress of the electric device.

Several types of histograms may be built, histograms are defined by bins representing values, temperature range, speed range acceleration range and the number of elementary cycles in said bin.

For example, the histogram bins represent a couple like an average of the temperature and a temperature variation. The temperature can either be measured by a sensor or be computed from a thermal model that converts the voltage and intensity input signal into a temperature fluctuation in the electric device.

For example, when the electric device is a power module for an electric car, each histogram bin corresponds to a couple speed/acceleration, and the value stored by each bin is the number of elementary distance for this mode.

For example, when the electric device is an offshore windmill, each histogram bin corresponds to the output power and the value stored by each bin is the number of elementary time period, for example, 1 second spent in this mode.

The histogram may be normalized to one, i.e. each bin value is divided by the sum of all bins. In this case, the scaling factor is memorized as part of collection of histogram information.

At next step S602, the processor 200 checks if it is time to evaluate the damage of the electric device. For example, during maintenance operation, the damage of the electric device is evaluated or the damage of the electric device is evaluated periodically, for example every day, or week or the damage of the electric device is evaluated each time the system comprising the electric device is powered on.

If it is time to evaluate the damage of the electric device, the processor 200 moves to step S603. Otherwise the processor 200 returns to step S600.

At next step S603, the processor 200 transfers the histogram to the server Serv.

At next step S604, the processor 200 receives from the server Serv a damage estimation level.

At next step S605, the processor 200 commands the display 207 in order to notify the damage information of at least one electric device.

According to a particular mode of realization, the processor 200 commands the display 207 in order to notify the level of damage of at least one electric device.

According to another particular mode of realization, the processor 200 commands the display 207 in order to notify an estimation of the remaining lifetime before failure of at least one electric device. The remaining lifetime before failure determined by the processor 200. For example, the processor 200 uses a linear extrapolation of the total damage level evolution through time, and where the remaining lifetime before failure is obtained by computing the crossing point between the extrapolated curve of total damage level and a damage level threshold.

More precisely, the algorithm of FIG. 6B is executed by the processor 300 of the server Serv.

At step S650, the processor 300 obtains a collection of histograms from memory, and the corresponding damage. In the case of a collection of normalized histograms, the scaling factor is also obtained.

The collection of histograms is generated from a database of histograms. The database of histograms may be obtained from several measurements of cycles and of the damage on several other similar electric devices. The collection of histograms is stored in the damage assessment device at manufacturing and/or updated during the maintenance of the electric device.

For example, when the damage is related to the number of power cycles, when a device breaks, the histogram of stresses, according to the power cycles, temperature, temperature variation definition, is stored in the database as a new observed profile. The histogram might be first normalized to one each bin value is divided by the sum of all bins, which involves that the value 1 now represents the break threshold for the profile.

When a maintenance operation is performed, a measure of the damage may be made, for example by measuring a particular output of a test, and stored along with the histogram in the database as a new observed profile or by replacing an existing profile.

When the number N of profiles in the database becomes too large, a pruning of the observed profiles may be necessary in order to limit the complexity of the minimizing of the utility function.

In other words, the processor 300 extracts a collection of L reference profiles from N database profiles, where N can grow with time according to feedback from the device fleet updated during maintenance and where the L reference profiles are not necessarily a selection of L out of N profiles. This defines the training phase of the a vector quantization, where the training set is the set of N histograms of observed profiles, the L centroids are the histograms of reference profiles, and the distance may be a utility function used in the damage evaluation.

For example, in order to build the collection of histograms, it is picked an observed profile from the database at random out of the N.

For example, a histogram of reference profile is found as the closest to the picked observation profile according to the utility function.

For example, the histogram of reference profile is moved to the collection of histograms by applying a weighted average of the histograms of two profiles.

The previous steps for building the collection of histograms are repeated a given number of times.

The extraction of the collection can also be performed to facilitate the following step of damage level estimation. For example, the collection can be selected to build a basis of linearly independent histograms where another observed vector can be easily expressed as a linear combination of the histograms in the basis.

At step S651, the processor 300 detects the reception of a histogram from a damage assessment device 10.

At next step S652, the processor 300 compares the histogram received at step S650 to the collection of histograms stored in the server Serv.

The processor 300 obtains a collection of histograms from memory.

The collection of histograms may be obtained from several measurements of cycles and of the damage on several electric devices.

The processor 300 computes, for each histogram of the collection of histograms, the damage value by considering the collection of histograms to the closest to histogram received at step S651.

The processor 300 determines a damage level estimation of the electric device.

The processor 300 compares the histogram received at step S651 to the collection of histograms.

From a general point of view, the processor 300 performs a comparison with quadratic distance. Thus, one can define a general approach for estimating the damage as a minimization of a utility function $D(p_i, p_{ob}, \{a_i\} \in \Omega)$ where $\Omega$ is the target set of set of parameters $\{a_i\}$ to which the minimization is restricted. For example $\Omega$ is either the whole set of real valued vectors of size L or the set of L vectors of size L with all null entries but one equal to one, or the set of vectors of size L with all null entries but M for a combination of the most relevant M profiles. The utility function $D(p_i, p_{ob}, \{a_i\} \in \Omega)$ is for example a quadratic distance, a max-distance or a modified Kullback-Liebler divergence.

The algorithm for minimizing the utility function may be an exhaustive search, when possible, among the set $\Omega$ of solutions or a random search among the set $\Omega$ of solutions or an algorithm, such as the Moore-Penrose Pseudo inverse, when the utility function is the quadratic distance and when $\Omega$ is the whole set of real valued vectors of size L.

According to a first particular mode of realization, the processor 300 compares the obtained history of stresses in the form of a histogram, to a collection of reference profiles in the form of histograms. The history of stresses is a histogram $H_{ob}=(H_{ob}(1), \ldots, H_{ob}(K))$, where K is the number of bins of the histogram which can be multi dimensional, each bin being associated to a t-uple of values, for example a couple (temperature, temperature variation). Each histogram $H_i$ of the profile collection is of the same form as $H_{ob}$.

The processor 300 may, if it not already performed, normalize the histogram representing the history of stresses, in which the sum $$S_{ob} = \sum_k H_{ob}(k)$$

is computed and allows to define the normalized histogram $p_{ob}$ such that $p_{ob}(k)=H_{ob}(k)/S_{ob}$.

The processor 300 may perform the same normalization if needed, for all of L histograms $H_i$ of the collection of normalized histograms $p_i$.

The processor 300 computes the distances $D(p_{ob}, p_i)$ which allows to characterize the resemblance between $H_i$ belonging to the collection of histograms and $H_{ob}$ stored in memory at step S601, and which is null if $H_i=H_{ob}$.

For example, the processor 300 uses the following utility function to be minimized $$D(p_i, p_{ob}) = \sum_k \|p_i(k) - p_{ob}(k)\|^2$$

which is a quadratic distance, $$D(p_i, p_{ob}) = \max_k \|p_i(k) - p_{ob}(k)\|$$

which is a max-distance, $$D(p_i, p_{ob}) = \sum_k p_i(k) \log\left(\frac{p_i(k)+\varepsilon}{p_{ob}(k)+\varepsilon}\right)$$

which is a modified Kullback-Liebler divergence and $\varepsilon$ is a parameter that stabilizes the computation.

According to a second particular mode of realization, the profile collection containing histograms are combined in order to approach the obtained histogram of the history of stresses.

Preferably, the combination is linear, i.e., the processor 300 finds the set of parameters such that a distance D( ) is minimized. For example, the processor 300 defines the following utility function to be minimized $$D(p_i, p_{ob}, \{a_i\}) = \left\| \sum_{i=1}^{L} a_i p_i - p_{ob} \right\|^2 = \sum_{k=1}^{K} \left| \sum_{i=1}^{L} a_i p_i(k) - p_{ob}(k) \right|^2$$

This can be obtained by defining a matrix P such that $P(k,i)=p_i(k)$, and a vector A such that $A(i)=a_i$. Thus, the comparison is performed by finding A that minimizes $$\hat{A} = \min_{A} \|PA - p_{ob}\|^2$$

where $\hat{A}$ can be obtained by using the Moore-Penrose pseudo inverse computation.

The processor 300 determines the damage from the result of the comparison.

From a general point of view the processor 300 estimates the damage from the set of parameters $\hat{a}_i$ obtained after the optimization function by $$d_{ob} = S_{ob} \sum_i \hat{a}_i \frac{d_i}{S_i}$$

According to the first particular mode of realization, the processor 300 determines the index $\hat{i}$ as the one minimizing the utility function $D(p_{ob}, p_i)$, which allows to obtain a damage estimation $d_{ob}=d_{\hat{i}}S_{ob}/S_{\hat{i}}$ associated to the obtained history of stresses, where $d_i$ is the damage value associated to the reference profile i.

It has to be noted here that the estimated damage is either directly the total damage of the electric device or accumulated to the previous total damage estimation.

According to the second particular mode of realization, once A is found, which gives the parameters $\hat{a}_i$, the processor 300 computes the damage estimation by using $$d_{ob} = S_{ob} \sum_i \hat{a}_i \frac{d_i}{S_i}$$

At next step S653, the processor 300 commands the transfer of the determined damage level to the damage assessment device 10.

FIGS. 7A and 7B represent a fourth example of an algorithm for determining the level of damage of an electric device according to the present invention.

More precisely, the algorithm of FIG. 7A is executed by the processor 200 of the damage assessment device 10.

At step S700, the processor 200 obtains cycles related to the electric device for which the level of damage estimation is performed.

A cycle is, for example, a change of the electric device operating temperature within a given temperature range during the functioning of the electric device.

A cycle may be an operation of the electric device within a given range of speed and/or acceleration during the functioning of the electric device.

At next step S701, the processor 200 stores the obtained cycle in memory in the form of a histogram and/or updates a histogram formed already from previous obtained cycles.

The processor 200 builds a histogram representing the history of stress of the electric device.

Several types of histograms may be built, histograms are defined by bins representing values, temperature range, speed range acceleration and the number of elementary cycles in said bin.

For example, the histogram bins represent a couple like an average of the temperature and a temperature variation. The temperature can either be measured by a sensor or be computed from a thermal model that converts the voltage and intensity input signal into a temperature fluctuation in the electric device.

For example, when the electric device is a power module for an electric car, each histogram bin corresponds to a couple speed/acceleration, and the value stored by each bin is the number of elementary distance for this mode.

For example, when the electric device is an offshore windmill, each histogram bin corresponds to the output power and the value stored by each bin is the number of elementary time period, for example, 1 second spent in this mode.

The histogram may be normalized to one, i.e. each bin value is divided by the sum of all bins. In this case, the scaling factor is memorized as part of collection of histogram information.

At next step S702, the processor 200 checks if it is time to evaluate the damage of the electric device. For example, during maintenance operation, the damage of the electric device is evaluated or the damage of the electric device is evaluated periodically, for example every day, or week or the damage of the electric device is evaluated each time the system comprising the electric device is powered on.

If it is time to evaluate the damage of the electric device, the processor 200 moves to step S603. Otherwise the processor 200 returns to step S600.

At next step S703, the processor 200 transfers the histogram to the server Serv.

At next step S704, the processor 200 receives from the server Serv a damage estimation level.

At next step S705, the processor 200 commands the display 207 in order to notify the damage information of at least one electric device.

According to a particular mode of realization, the processor 200 commands the display 207 in order to notify the level of damage of at least one electric device.

According to another particular mode of realization, the processor 200 commands the display 207 in order to notify an estimation of the remaining lifetime before failure of at least one electric device. The remaining lifetime before failure determined by the processor 200. For example, the processor 200 uses a linear extrapolation of the total damage level evolution through time, and where the remaining lifetime before failure is obtained by computing the crossing point between the extrapolated curve of total damage level and a damage level threshold.

More precisely, the algorithm of FIG. 7B is executed by the processor 300 of the server Serv.

At step S750, the processor 300 obtains histograms received from damage level assessment devices for other electric devices with same functionality as the one for which the damage level assessment is performed. The histograms are received for example during maintenance operation and/or periodically.

For example, when histograms are related to the number of power cycles, when a device breaks, the received histograms of stresses, according to the power cycles, temperature, temperature variation definition, are stored in the database of the server Serv as a new observed profile. The histogram might be first normalized to one, each bin value is divided by the sum of all bins, which involves that the value 1 now represents the break threshold for this profile.

When a maintenance operation is performed, a measure of the damage may be made, for example by measuring a particular output of a test, and stored along with the histogram in the database as a new observed profile or by replacing an existing profile.

At next step S751, the processor 300 updates a database of histograms with the received histograms.

When the number of observed profiles becomes too large, the processor 300 truncates the collection of histograms in order to limit the complexity of the minimizing of the utility function.

In other words, the processor 300 extracts L reference profiles from N observed profiles, where N can grow with time according to feedback from the device fleet updated during maintenance, and where the L reference profiles are not necessarily a selection of L out of N profiles. This defines the training phase of the a vector quantization, where the training set is the set of N histograms of observed profiles, the L centroids are the histograms of reference profiles, and the distance may be a utility function used in the damage evaluation.

For example, in order to build the collection of histograms, an observed profile is picked from the database at random out of the N.

For example, a histogram of reference profile is found as the closest to the picked observation profile according to the utility function.

For example, the histogram of reference profile is moved to the collection of histograms by applying a weighted average of the histograms of two profiles.

The previous steps for building the collection of histograms are repeated a given number of times.

The extraction of the collection can also be performed to facilitate the following step of damage level estimation. For example, the collection can be selected to build a basis of linearly independent histograms where another observed vector can be easily expressed as a linear combination of the histograms in the basis.

At next step S752, the processor 300 selects a collection of histograms from the database of histograms.

At next step S753, the processor 300 receives a histogram from a damage assessment device 10.

A next step S754, the processor 300 compares the histogram received at step to the collection of histograms formed at step S752 in order to determine a damage level estimation of the electric device.

From a general point of view, the processor 300 performs a comparison with quadratic distance. Thus, one can define a general approach for estimating the damage as a minimization of a utility function $D(p_i, p_{ob}, \{a_i\} \in \Omega)$ where $\Omega$ is the target set of set of parameters $\{a_i\}$ to which the minimization is restricted. For example $\Omega$ is either the whole set of real valued vectors of size L or the set of L vectors of size L with all null entries but one equal to one, or the set of vectors of size L with all null entries but M for a combination of the most relevant M profiles. The utility function $D(p_i, p_{ob},$ $\{a_i\} \in \Omega)$ is for example a quadratic distance, a max-distance or a modified Kullback-Liebler divergence.

The algorithm for minimizing the utility function may be an exhaustive search, when possible, among the set $\Omega$ of solutions or a random search among the set $\Omega$ of solutions or an algorithm, such as the Moore-Penrose Pseudo inverse, when the utility function is the quadratic distance and when $\Omega$ is the whole set of real valued vectors of size L.

According to a first particular mode of realization, the processor 300 compares the obtained history of stresses in the form of a histogram, to a collection of reference profiles in the form of histograms. The history of stresses is a histogram $H_{ob}=(H_{ob}(1), \ldots, H_{ob}(K))$, where K is the number of bins of the histogram which can be multi dimensional, each bin being associated to a t-uple of values, for example a couple (temperature, temperature variation). Each histogram $H_i$ of the profile collection is of the same form as $H_{ob}$.

The processor 300 may, if it not already performed, normalize the histogram representing the history of stresses, in which the sum $$S_{ob} = \sum_k H_{ob}(k)$$

is computed and allows to define the normalized histogram $p_{ob}$ such that $p_{ob}(k)=H_{ob}(k)/S_{ob}$.

The processor 300 may perform the same normalization if needed, for all of L histograms $H_i$ of the collection of normalized histograms $p_i$.

The processor 300 computes the distances $D(p_{ob}, p_i)$ which allows to characterize the resemblance between $H_i$ belonging to the collection of histograms and $H_{ob}$ stored in memory at step S701, and which is null if $H_i=H_{ob}$.

For example, the processor 300 uses the following utility function to be minimized $$D(p_i, p_{ob}) = \sum_k \|p_i(k) - p_{ob}(k)\|^2$$

which is a quadratic distance, $$D(p_i, p_{ob}) = \max_k \|p_i(k) - p_{ob}(k)\|$$

which is a max-distance, $$D(p_i, p_{ob}) = \sum_k p_i(k) \log\left(\frac{p_i(k) + \varepsilon}{p_{ob}(k) + \varepsilon}\right)$$

which is a modified Kullback-Liebler divergence and $\varepsilon$ is a parameter that stabilizes the computation.

According to a second particular mode of realization, the profile collection containing histograms are combined in order to approach the obtained histogram of the history of stresses.

Preferably, the combination is linear, i.e., the processor 300 finds the set of parameters $a_1, \ldots, a_L$ such that a distance $D(\ )$ is minimized. For example, the processor 300 defines the following utility function to be minimized $$D(p_i, p_{ob}, \{a_i\}) = \left\| \sum_{i=1}^{L} a_i p_i - p_{ob} \right\|^2 = \sum_{k=1}^{K} \left| \sum_{i=1}^{L} a_i p_i(k) - p_{ob}(k) \right|^2$$

This can be obtained by defining a matrix P such that $P(k,i)=p_i(k)$, and a vector A such that $A(i)=a_i$. Thus, the comparison is performed by finding A that minimizes $$\hat{A} = \min_{A} \|PA - p_{ob}\|^2$$

where $\hat{A}$ can be obtained by using the Moore-Penrose pseudo inverse computation.

The processor 300 determines the damage from the result of the comparison.

From a general point of view the processor 300 estimates the damage from the set of parameters $\hat{a}_i$ obtained after the optimization function by $$d_{ob} = S_{ob} \sum_{i} \hat{a}_i \frac{d_i}{S_i}$$

According to the first particular mode of realization, the processor 300 determines the index $\hat{i}$ as the one minimizing the utility function $D(p_{ob}, p_i)$, which allows to obtain a damage estimation $d_{ob} = d_{\hat{i}} S_{ob}/S_{\hat{i}}$ associated to the obtained history of stresses, where $d_i$ is the damage value associated to the reference profile i.

It has to be noted here that the estimated damage is either directly the total damage of the electric device or accumulated to the previous total damage estimation.

According to the second particular mode of realization, once A is found, which gives the parameters $\hat{a}_i$, the processor 300 computes the damage estimation by using $$d_{ob} = S_{ob} \sum_{i} \hat{a}_i \frac{d_i}{S_i}$$

At next step S754, the processor 300 commands the transfer of the determined damage level to the damage assessment device 10.

Naturally, many modifications can be made to the embodiments of the invention described above without departing from the scope of the present invention.

The invention claimed is:

1. A method for estimating a level of damage of an electric device comprising:
   forming a histogram of operating cycles related to the electric device for which the level of damage estimation is performed, wherein the formed histogram and histograms of a collection of histograms are defined by bins representing temperature range, speed range, acceleration range and a number of elementary cycles in said bin and the formed histogram and the histograms of the collection of histograms are normalized by dividing, for each bin, the number of elementary cycles by a sum of the number of elementary cycles in the bins;
   comparing the formed histogram to histograms of the collection of histograms or to combinations of histograms of the collection of histograms, each histogram of the collection of histograms being associated to the level of damage, and determining the histogram of the collection of histograms or the combination of histograms which is closest from the formed histogram;
   estimating the level of damage of the electric device from the level of damage of a closest histogram or from the levels of damages of the histograms of the closest combination of histograms; and
   warning a user of the electric device a state of the electric device using the estimate of the level of damage of the electric device.

2. The method according to claim 1, wherein the collection of histograms is generated from a database of histograms obtained from measurements of cycles and of level of damages of other electric devices having a same functionality as the electric device.

3. The method according to claim 1, wherein the comparing the formed histogram to histograms of the collection of histograms or to the combinations of histograms of the collection of histograms is performed by a comparison with quadratic distance.

4. The method according to claim 1, wherein the method comprises further step of notifying the determined estimate of the level of damage.

5. The method according to claim 1, wherein the method comprises further step of converting the level of damage into a lifetime expectation, and notifying the remaining lifetime expectation.

6. The method according to claim 1, wherein combinations of histograms are linear combinations of histograms.

7. The method according to claim 1, wherein the method is executed by a damage assessment device and in that the collection of histograms is stored in the memory of the damage assessment device or is obtained from a server through a telecommunication network.

8. The method according to claim 1, wherein the step of forming the histogram of operating cycles is performed by a damage assessment device and in that the method comprises further step of transferring the formed histogram to a server which performs the comparing step, the determining steps and a further step of transferring the estimate of the level of damage of the electric device to the damage assessment device.

9. A method according to claim 8, wherein the method further comprises:
   receiving histograms obtained from measurements of cycles and of level of damages of other electric devices having a same functionality as the electric device, and updating the database of histograms using the received histograms.

10. A system for estimating a level of damage of an electric device characterized in that the system for estimating comprises:
    a processor; and
    a memory storing instructions that are operable, when executed by the processor, to cause the processor to perform operations comprising:
    forming a histogram of operating cycles related to the electric device for which the level of damage estimation is performed, wherein the formed histogram and histograms of a collection of histograms are defined by bins representing temperature range, speed range, acceleration range and a number of elementary cycles in said bin and the formed histogram and histograms of the collection of histograms are normalized by dividing, for each bin, the number of elementary cycles by a sum of the number of elementary cycles in the bins;

compared the formed histogram to histograms of the collection of histograms or to combinations of histograms of the collection of histograms, each histogram of the collection of histogram being associated to a level of damage and determining the histogram of the collection of histograms or the combination of histograms which is closest from the formed histogram;

estimating the level of damage of the electric device from the level of damage of a closest histogram or from the levels of damages of the histograms of the closest combination of histograms; and warning a user of the electric device a state of the electric device using the estimate of the level of damage of the electric device.

11. The system according to claim 10, wherein the system comprises a damage assessment device which comprises means for storing in a memory the collection of histograms or further comprises means for obtaining from a server the collection of histograms through a telecommunication network.

12. The system according to claim 11, wherein the operations further comprises:

receiving from electric devices histograms obtained from measurements of cycles and of level of damages of other electric devices having a same functionality as the electric device, and updating a database of histograms using the received histograms.

* * * * *